Patented Dec. 10, 1929

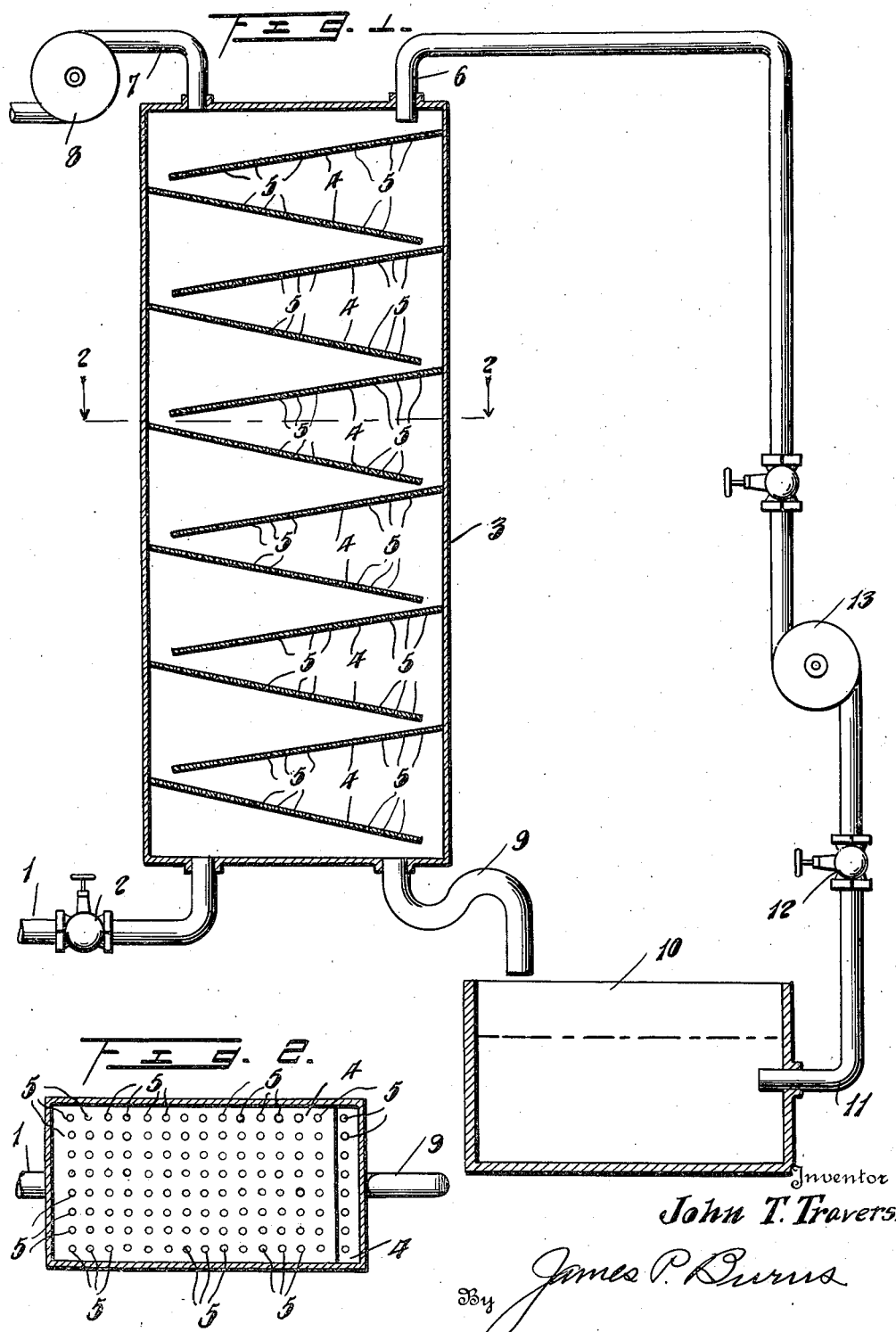

1,738,543

UNITED STATES PATENT OFFICE

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO

PROCESS FOR REMOVING ODORS FROM GASES AND AIR

Application filed May 18, 1928. Serial No. 278,823.

This invention relates to a novel process for the removal of foul odors from gases and air. The process has specific reference to the removal of noxious gases which are directly or indirectly the products of the putrefaction or decay of animal and vegetable proteins. These gases are produced in such industries as the manufacture of organic fertilizer, rendering plants, reduction plants, packing houses, garbage reduction plants and other kindred industries.

The chief odor producing compounds present in such noxious gases are mercaptans, putrescine, cadaverine, indole and scatole, and it is to the removal of these compounds that the process forming the subject matter of this invention, is principally directed.

In its more specific aspect, the process contemplates the treatment of the gases or air with a treating mixture containing reagents capable of absorbing, adsorbing and reacting with the odor forming compounds present in the gases or air treated. The treating mixture is preferably employed in the form of a milk with which the gases to be treated are caused to physically contact for a time period sufficient to effect the necessary adsorption, absorption and reaction to eliminate the odors therefrom.

I am aware that various processes have heretofore been devised for the purpose of purifying gases, some of which are directed to the removal of specific odors therefrom. These prior art processes do not, however, in any instance contemplate the provision of a treating mixture or reagent capable of removing all of the several odor producing compounds above enumerated, which are variously found in the gases produced in such industrial plants as those mentioned.

It is the purpose of this invention to provide a treating mixture for gases and air which will be of more or less universal application and capable of removing from noxious industrial gases any of the above enumerated odor producing compounds.

I am furthermore aware that certain of the prior art disclosures have contemplated the employment of milk of lime solutions in the treatment of gases. While the treating mixture employed in my process is referred to as a milk, that is not to be confused with the usual milk of lime solution.

I have ascertained that the odor producing compounds may be removed from gases by treatment with a milk containing a specially concentrated marl, (the specifications of which will be hereinafter given) hydrated lime, ferrous sulfate or an equivalent iron salt. The marl for use in this process must meet the following specifications:

Matter insoluble in a solution of 1 part $H_2O$ to 1 part 1.19 specific gravity HCl not less than 5%.
Total calcium carbonate and magnesium carbonate not less than 70% nor over 95%.
Flotation value—the rate of settling in still water must be less than 4 inches per minute.

It has been found that marl concentrated to meet these specifications will contain the greater portion of the activated portions of the original marl. The activated portions of the original marl are due principally to its content of clay in the process of decay. It is a scientific fact that clays, during the process of decay, have marked adsorptive and absorptive properties, and I have ascertained that these properties render such a concentrated marl highly efficient in removing odor producing compounds from gases and air. It will be appreciated that a marl which meets with the first two qualifications set forth in the above specifications, may be made to comply with the flotation value set forth in the specifications by segregating that portion of the marl which possesses the required flotation value and rejecting the remaining portions of the marl.

The composition of the treating mixture may be very elastic. The content of marl may vary between wide limits. For practical purposes the marl content should not be less than 50% of the mixture, nor in excess of 80%, while the hydrated lime may vary from 15% to 35%, and the ferrous sulfate from 5% to 15%. The hydrated lime content of the mixture should, however, always be in sufficient excess to effect a complete reaction with the ferrous sulfate of the mixture when the mixture is incorporated in water to produce a milk. An exemplary composition which I have found to give excellent results and adapted to function efficiently over prolonged periods, is as follows:—

| | Per cent |
|---|---|
| Marl | 70 |
| Hydrated lime | 20 |
| Ferrous sulfate or equivalent iron salt | 10 |

As above pointed out, this mixture is employed in the form of a milk which is produced by mixing a quantity of the mixture with water. The concentration of the milk may also vary between relatively wide limits. It will be appreciated, however, that the concentration should never be so great as to prevent a free flow of the milk. The milk may be advantageously formed by mixing the treating mixture with water in the proportions of one part treating mixture to four parts of water. When formed in this manner, the milk will flow freely. It will furthermore be appreciated that when the mixture has been incorporated in the milk, the calcium hydroxide and the ferrous sulfate react forming calcium sulphate and ferrous hydroxide, which are present in the milk as such. The milk, therefore, contains the specially concentrated marl, calcium hydroxide and calcium sulphate and ferrous hydroxide, no ferrous sulfate being present as such in the treating milk. The ferrous hydroxide will become oxidized during the operation of the process, but this does not lessen its effectiveness in the milk since ferric hydroxide is fully as effective.

When air, or gases, containing mercaptans are treated with the mixture above defined, the mercaptans unite with the iron salts forming additional compounds. The reaction may be shown as follows:—

$$X\ C_2H_5SH\ plus\ x\ Fe(OH)_2 = (C_2H_5SHx) : (Fe(OH)_2)x$$

In the event that the gases or air treated contain such putrefactive bases as putrescine and cadaverine, the reactions for which are the same, the reaction will be the following:

```
CH₂NH₂                      CH₂OH
  |                           |
(CH₂)₄ plus Ca(OH)₂ plus H₂O = (CH₂)₄ plus 2NH₃ plus Ca(OH)₂
  |                           |
CH₂NH₂                      CH₂OH putrescine                  odorless
                            di-hydroxy
                            alcohol
``` or differently written $$(CH_2)_2.2(CH_2NH_2) + Ca(OH)_2 + 2H_2O = (CH_2)_2.2(CH_2OH) + 2NH_3 + Ca(OH)_2$$

The odor producing compounds such as indole and scatole, the reactions for which are the same, are oxidized as follows:—

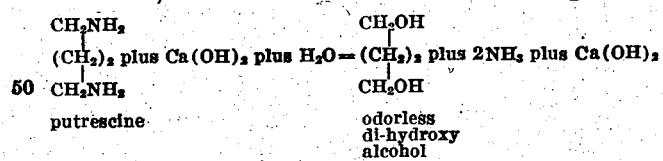

```
    2CH        2C(OH)
     |          |
    CH + O₂ = CH
     |          |
     NH         NH
    indole    indoxyl
``` or $$3(CH).NH + O_2 = 2C(OH).CH.NH$$

The indoxyl produced by the last reaction is an odorless compound, soluble in an alkaline solution.

The specially concentrated marl combines or reacts with all these various odor producing compounds by virtue of its adsorptive and absorptive powers. It will thus be noted that the mixture employed in my process is capable of the removal from gases and air of any one or all of the odor producing compounds hereinbefore enumerated which may be present therein.

As illustrative of a specific method for carrying out the process forming the subject matter of this invention, reference will now be had to an apparatus suitable for practicing the process. Such an apparatus is diagrammatically illustrated in the accompanying drawings wherein:

Figure 1 is a view in side elevation of the treating tower;

Fig. 2 is a detail view of one of the baffles employed in the tower.

The gases to be treated may be conveyed through a suitable conduit (1) controlled by a valve (2) into the lower end of a contact tower (3). The tower is provided with a plurality of vertically disposed, inclined baffle members (4). Each of these baffle members is provided with a multiplicity of minute orifices (5). The degree of angularity and the size of the orifices in the baffle members are important factors, since approximately 75% of the adsorption, absorption and reactions occur during the contact of the gases with the films on the underside of the baffles.

The angularity of the baffles and the orifices therein, should be such that the treating mixture which may be supplied to the tower through the line (6), will form in thin moving films on both the upper and lower surfaces of the baffle members. It is highly important that the arrangement of the baffles be such that a thin moving film of liquid will be provided on the underneath surface of each baffle, since the greatest contact between the gases and the treating mixture occurs at these points within the treating tower (3). By the provision of a treating tower having baffles of this character, it will be observed that the gases are compelled to follow a circuitous path in their travel upwardly through the tower and to repeatedly contact with the moving films of treating mixture. It will be observed that the inclination of the baffle members is such as to compel the gases or air rising through the tower to sweep downwardly following each successive contact with a baffle member, thus compelling a prolonged intimate contact between the gases and the films moving over the under-surfaces of the baffle members. The gases or air in passing through one baffle to the space beneath the next succeeding baffle must pass through the liquid cascading from one baffle to the next lower baffle in the tower. It will be apparent that the gases have successive contacts with moving films of the treating mixture and that the gases are scrubbed intermediate each film contact by passage through the cascading liquid treating mixture. The gases, subsequent to passage through the tower, pass through the outlet (7) and the flow of the gases through the tower may be accelerated by the employment of a suitable suction device such as indicated at (8).

The treating liquid may be advantageously led from the lower end of the tower through the line (9) to a suitable sump (10) and again returned from the sump to the treating tower via the line (11) controlled by the valve (12) and the pump (13) which delivers the liquid treating mixture to the inlet line (6).

In the practice of the process, it will be found that the treating milk composition will be effective for the removal of odor producing compounds from gases and air for exceedingly prolonged periods. This is partially due to the fact that the adsorptive, absorptive and reactive powers of the treating milk composition are exceptionally high and further due to the fact that the odor producing compounds, while adequate to seriously contaminate the atmosphere surrounding an industrial plant where they are produced, are, in reality, present in very small amounts. The relatively insignificant cost of the treating mixture does not render its replacement uneconomic and furthermore entirely eliminates the practical necessity for regenerating the same.

By the term "suitably concentrated marl" as used in the appended claims it is to be understood that I mean a marl meeting with the specifications hereinbefore set forth.

What I claim for my invention is:—

1. A process for the removal from air and gases of the foul odors of indole, scatole, putrescine, cadaverine and mercaptans present in the air or gas either individually or collectively, comprising passing the contaminated air or gas in physical contact with a treating composition characterized by its content of a suspension of a suitably concentrated marl.

2. A process for the removal from air and gases of the foul odors of indole, scatole, putrescine, cadaverine, and mercaptans present in the air or gas either individually or collectively, comprising passing the contaminated air or gas in physical contact with a treating composition characterized by its content of a suspension of a suitably concentrated marl and a substantial content of calcium hydroxide.

3. A process for the removal from air and gases of the foul odors of indole, scatole, putrescine, cadaverine, and mercaptans present in the air or gas either individually or collectively, comprising passing the contaminated air or gas in physical contact with a treating composition characterized by its content of a suspension of a suitably concentrated marl, a substantial content of calcium hydroxide and a substantial content of calcium sulphate.

4. A process for the removal from air and gases of the foul odors of indole, scatole, putrescine, cadaverine and mercaptans present in the air or gas either individually or collectively, comprising passing the contaminated air or gas in physical contact with a treating composition characterized by its content of a suspension of a suitably concentrated marl, a substantial content of calcium hydroxide, a substantial content of calcium sulphate and substantial content of the hydroxides of iron.

JOHN T. TRAVERS.